United States Patent Office 3,748,332
Patented July 24, 1973

3,748,332
CATALYSIS
Geoffrey Wilkinson, London, England, assignor to Johnson, Matthey & Co., Limited, London, England
No Drawing. Filed July 7, 1970, Ser. No. 53,032
Claims priority, application Great Britain, July 14, 1969, 35,249/69
Int. Cl. C07f 15/00
U.S. Cl. 260—270 R     3 Claims

ABSTRACT OF THE DISCLOSURE

Ruthenium (II) carboxylates of the general formula $Ru_2(OCOR)_4$, and processes for preparing them by heating together a soluble salt of ruthenium, a soluble salt of carboxylate and the corresponding carboxylic acid.

---

This invention relates to compounds of ruthenium. More particularly it relates to new compositions of matter, namely di-ruthenium tetracarboxylates, in particular the acetate and its adducts with stabilizing donor ligands such as triphenyl phosphine and pyridine.

The only well defined ruthenium carboxylates known heretofore are those of the type $Ru_2(OCOR)_4Cl$ which can be formulated with one RuII and one RuIII or with two equivalent Ru atoms of oxidation state 2.5.

Compounds according to the invention are useful as catalysts or catalyst precursors. We have now prepared the green ruthenium (II) acetate, $Ru_2(OCOMe)_4$. This is obtained by the interaction of commercial ruthenium trichloride with acetic acid, sodium acetate and ethanol under reflux. It is difficult to obtain the acetate of ruthenium entirely free of sodium acetate and solvent, but the compound can also be readily isolated as its green triphenyl phosphine adduct, $Ru_2(OCOMe)_4 \cdot 2PPh_3$. The acetate and its adduct are both diamagetic, (nuclear magnetic resonance (n.m.r.) measurements).

We have also prepared the bis (pyridine) adduct. According to further features of this invention, therefore, new compositions of matter comprise the pyridine and triphenyl phosphine adducts of ruthenium (II) acetate $Ru_2(OCOMe)_4$.

These compounds may be formulated

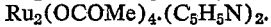

PREPARATION OF DIRUTHENIUM $\mu_4$ ACETATE

A solution of hydrated ruthenium "trichloride" (Johnson Matthey & Co. Ltd., London), (2 g.) and sodium acetate trihydrate (4 g.) in glacial acetic acid (50 ml.) and ethenol (50 ml.) was refluxed, whereupon the red-violet colour changed to dark green after 4 hours. The solution was evaporated to dryness in vacuum, the solid extracted with the minimum of absolute ethanol and the insoluble sodium salts filtered off. Evaporation of the filtrate gave a green-black solid, which contained no chloride, and analysed approximately as $Ru_2(OCOMe)_4$. [Found: C, 22.9%; H, 3.5%; $C_8H_{12}O_8Ru_2$ requires C, 21.8%, H, 2.7%).

The product is soluble in water and in alcohols, and, in the presence of phenol, it dissolves in benzene, acetone, $CCl_4$, $CHCl_3$ etc., in which it is normally insoluble.

DIRUTHENIUM (II) $\mu_4$-ACETATE BIS (TRIPHENYLPHOSPHINE) AND BIS (PYRIDINE)

To the green-black acetate in methanol was added excess of a saturated methanolic solution of triphenylphosphine at room temperature. After standing overnight the green crystals of the adduct were collected, washed with cold methanol and dried in a stream of nitrogen. The product was recrystallised from benzene-methanol. Yield ca. 70% based on ruthenium content of $RuCl_3$ aq.; decomposition: 183° C. [Analysis—found: C, 54.5%; H, 4.6%; P, 6.3%. Molecular weight determination in benzene gave 960. Empirical formula: $C_{44}H_{42}O_8P_2Ru_2$ requires C, 54.8%; H, 4.4%; P, 6.4%; and a m. wt. of 963.]

Bulk susceptibility measurements by the Guoy method and the usual correction for diamagnetism of the ligands showed the complex to be diamagnetic. The solid showed only a very weak electron spin resonance signal which could be attributed to a trace of a paramagnetic impurity.

Addition of pyridine to a methanolic solution of the acetate by an analogous method to that described above for the $PPh_3$ adduct gave a corresponding pyridine adduct as dark blue crystals.

To the green-black acetate (0.35 g.) in methanol (5 ml.) was added pyridine (1 ml.) under a nitrogen atmosphere. The solution changed from green to deep blue and after to cooling to 5° C. for several hours, deep blue crystals of the adduct were deposited. These were filtered, washed with the minimum of methanol and dried under nitrogen.

The adduct rapidly lost pyridine even when kept under an atmosphere of nitrogen. Decomposition: ca. 250° C. [Analysis.—Found: C, 34.8%, 34.6%; H, 3.4%, 3.5%; N, 4.6%, 4.7%. The empirical formula $C_{18}H_{22}N_2O_8Ru_2$ requires C, 36.3%; H, 3.7%; N, 4.7%.]

Protonation of these ruthenium compounds, preferably by a strong acid, produce species which are extremely active catalysts for hydrogenation reactions.

Protonation of a solution of the adduct

in methanol, in the presence of excess triphenylphosphine, with aqueous fluoroboric acid produced a species which strongly catalysed the hydrogenation of hex-1-ene.

The protonated acetate or adduct of the acetate is an extremely selective catalyst. Thus, no hydrogenation is observed with cis-pent-2-ene and other internal alkenes such as cyclohexene. From this point of view the catalyst appears to be much more selective from the corresponding rhodium-phosphine catalyst. Selectivity also occurs between cyclic non-conjugated dienes, cycloacta-1,5- diene being hydrogenated very rapidly in contrast to the slow rate for bicyclo (2.2.1) hepta-2,5 diene.

Higher carboxylates of ruthenium may be prepared in an analogous manner; for example the propionate may be obtained with sodium propionate and propionic acid in place of soduim acetate and acetic acid.

The benzoate may also be prepared in an analogous manner with sodium benzoate and benzoic acid.

Adducts with other stabilizing donor ligands may also be prepared. Examples are triphenyl phosphite, trialkyl phosphine or mixed aralkyl trisubstituted phosphines such as ethyl diphenyl phosphine. Other heterocyclic N-bases may be used in place of pyridine, e.g. quinoline, pyrrole.

Other N-bases may be used such as diphenylamine or triethylamine. The corresponding arsenic and antimony-containing molecules may be used as adduct forming stabilizing donor ligands in place of the above mentioned phosphorus compounds. Examples are triphenyl arsine or ethyldiphenyl stibine.

What I claim is:

1. An adduct of a ruthenium (II) carboxylate and a stabilizing donor ligand A, said adduct having the formula:

$$Ru_2(OCOR)_4 \cdot A_2$$

wherein R is methyl and A is selected from the group consisting of pyridine, and triphenyl phosphine.

2. The triphenyl phosphine adduct of ruthenium (II) acetate, $Ru_2(OCOMe)_4 \cdot 2PPh_3$.

3. The pyridine adduct of ruthenium (II) acetate, $Ru_2(OCOMe)_4 \cdot (C_5H_5N)_2$.

References Cited

UNITED STATES PATENTS

| | | | |
|---|---|---|---|
| 3,105,084 | 9/1963 | Wilkinson | 260—429 |
| 3,131,155 | 4/1964 | Luttinger | 252—428 |

OTHER REFERENCES

Johnson et al.: Inorg. Chem. 2 (1963), pp. 960–2.

Stephenson et al.: J. Inorg. Nucl. Chem. 1966 (28), pp. 2285–91.

DANIEL E. WYMAN, Primary Examiner

A. P. DEMERS, Assistant Examiner

U.S. Cl. X.R.

252—431 N, 431 P; 260—429 R, 666 R, 683.9